(12) United States Patent
Shi

(10) Patent No.: US 12,114,375 B2
(45) Date of Patent: *Oct. 8, 2024

(54) RANDOM ACCESS METHOD AND APPARATUS, AND USER EQUIPMENT AND NETWORK DEVICE

(71) Applicant: GUANGDONG OPPO MOBILE TELECOMMUNICATIONS CORP., LTD., Guangdong (CN)

(72) Inventor: Cong Shi, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/887,511

(22) Filed: Aug. 15, 2022

(65) Prior Publication Data

US 2022/0394760 A1 Dec. 8, 2022

Related U.S. Application Data

(63) Continuation of application No. 17/475,368, filed on Sep. 15, 2021, now Pat. No. 11,438,936, which is a
(Continued)

(51) Int. Cl.
*H04W 74/0833* (2024.01)
*H04W 72/1263* (2023.01)
(Continued)

(52) U.S. Cl.
CPC ..... *H04W 74/085* (2013.01); *H04W 72/1263* (2013.01); *H04W 74/006* (2013.01); *H04W 80/02* (2013.01)

(58) Field of Classification Search
CPC .......... H04W 74/085; H04W 72/1263; H04W 74/006; H04W 80/02
See application file for complete search history.

(56) References Cited

U.S. PATENT DOCUMENTS

2018/0124637 A1* 5/2018 Kim .................... H04W 52/146
2018/0124824 A1* 5/2018 Lee ....................... H04L 5/0094
(Continued)

OTHER PUBLICATIONS

Office Action of Europe Counterpart Application No. 19925662.9, issued on Sep. 22, 2022, pp. 1-6.
(Continued)

*Primary Examiner* — Will W Lin
(74) *Attorney, Agent, or Firm* — JCIP GLOBAL INC.

(57) ABSTRACT

Provided in the embodiments of the invention are a random access method and apparatus, and a user equipment and a network device. The method comprises: after a UE sends a first message, detecting a scheduling instruction of a second message in a first window, wherein the second message comprises at least one of the following: a first conflict resolution identifier, a second conflict resolution identifier, first indication information and second indication information; the first conflict resolution identifier is used for conflict resolution of a connected UE; the second conflict resolution identifier is used for conflict resolution of an idle UE, an inactive UE, or the connected UE; the first indication information is used for indicating that a two-step random access process returns to a four-step random access process; and the second indication information is used for indicating a random backoff value when the UE retransmits the first message.

14 Claims, 11 Drawing Sheets

--- after a UE sends a first message, detecting a scheduling instruction of a second message in a first window. The second message includes at least one of the following: a first conflict resolution identifier, a second conflict resolution identifier, first indication information and second indication information. The first conflict resolution identifier is used for conflict resolution of a connected UE. The second conflict resolution identifier is used for conflict resolution of an idle UE, an inactive UE, or the connected UE. The first indication information is used for indicating that a two-step random access process returns to a four-step random access process. The second indication information is used for indicating a random backoff value when the UE retransmits the first message

401

Related U.S. Application Data continuation of application No. PCT/CN2019/084154, filed on Apr. 24, 2019.

(51) Int. Cl.
*H04W 74/00* (2009.01)
*H04W 80/02* (2009.01)

(56) References Cited

U.S. PATENT DOCUMENTS

| | | | |
|---|---|---|---|
| 2018/0220288 A1* | 8/2018 | Agiwal | H04W 4/30 |
| 2018/0279182 A1 | 9/2018 | Sang et al. | |
| 2018/0324681 A1 | 11/2018 | Yilmaz et al. | |
| 2019/0335515 A1 | 10/2019 | Chen et al. | |
| 2020/0221402 A1* | 7/2020 | Zhang | H04W 56/001 |
| 2020/0245200 A1* | 7/2020 | Xiong | H04L 25/0226 |
| 2020/0245361 A1* | 7/2020 | Xiong | H04W 74/006 |
| 2020/0314913 A1* | 10/2020 | Rastegardoost | H04W 36/0077 |
| 2021/0136827 A1* | 5/2021 | Xiong | H04W 74/004 |
| 2022/0015155 A1* | 1/2022 | Lu | H04W 74/0841 |
| 2022/0086915 A1* | 3/2022 | Canonne-Velasquez | H04W 74/0833 |
| 2022/0095378 A1* | 3/2022 | Lei | H04W 74/0833 |
| 2022/0141883 A1* | 5/2022 | Lee | H04W 28/0294 370/329 |
| 2022/0141884 A1* | 5/2022 | Lee | H04W 72/23 370/329 |

OTHER PUBLICATIONS

Office Action of China Counterpart Application No. 202210100172.0, with English translation thereof, issued on Nov. 14, 2022, pp. 1-15.

NTT DOCOMO, Inc., "Initial consideration on 2 step RACH", 3GPP TSG-RAN WG2 Meeting #105bis R2-1905118, Apr. 2019, pp. 1-5.

OPPO, "On Procedure for 2-step RACH", 3GPP TSG RAN WG1 #96bis R1-1905052, Apr. 2019, pp. 1-5.

Office Action of Japan Counterpart Application, with English translation thereof, issued on Nov. 22, 2022, pp. 1-5.

Ericsson, "EDT fallback indicated in DCI.", 3GPP TSG RAN WG2 Meeting #104 R2-1818867, Nov. 2018, pp. 1-10.

"Office Action of Europe Counterpart Application", Application No. 19925662.9, issued on Dec. 21, 2022, p. 1-p. 5.

* cited by examiner after a UE sends a first message, detecting a scheduling instruction of a second message in a first window. The second message includes at least one of the following: a first conflict resolution identifier, a second conflict resolution identifier, first indication information and second indication information. The first conflict resolution identifier is used for conflict resolution of a connected UE. The second conflict resolution identifier is used for conflict resolution of an idle UE, an inactive UE, or the connected UE. The first indication information is used for indicating that a two-step random access process returns to a four-step random access process. The second indication information is used for indicating a random backoff value when the UE retransmits the first message

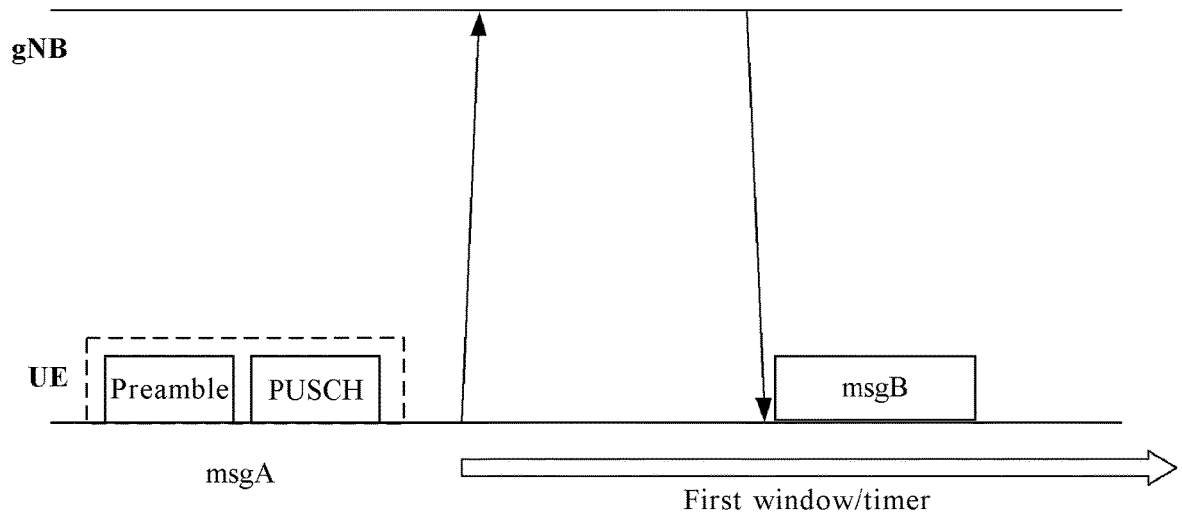

FIG. 5

| | | | | | | |
|---|---|---|---|---|---|---|

| R | R | R | R | TAC | | Oct 1 |
|---|---|---|---|---|---|---|
| TAC |||||| Oct 2 |
| C-RNTI |||||| Oct 3 |
| C-RNTI |||||| Oct 4 |
| Conflict resolution identifier |||||| Oct 5 |
| Conflict resolution identifier |||||| Oct 6 |
| Conflict resolution identifier |||||| Oct 7 |
| Conflict resolution identifier |||||| Oct 8 |
| Conflict resolution identifier |||||| Oct 9 |
| Conflict resolution identifier |||||| Oct 10 |

FIG. 6-3

RANDOM ACCESS METHOD AND APPARATUS, AND USER EQUIPMENT AND NETWORK DEVICE

CROSS-REFERENCE TO RELATED APPLICATION

This is a continuation application of and claims the priority benefit of U.S. application Ser. No. 17/475,368, filed on Sep. 15, 2021, now allowed. The prior U.S. application Ser. No. 17/475,368 is a continuation of international PCT application serial no. PCT/CN2019/084154, filed on Apr. 24, 2019. The entirety of the above-mentioned patent application is hereby incorporated by reference herein and made a part of this specification.

BACKGROUND

Field of the Disclosure

The embodiments of the disclosure relate to the field of mobile communication technology, and in particular to a random access method and apparatus, a user equipment, and a network device.

Description of Related Art

In the Long Term Evolution (LTE) system, the random access process adopts a four-step random access process. The New Radio (NR) system still adopts the four-step random access process in the LTE system. In the discussion regarding standardization, it is considered that the four-step random access process is relatively complicated and will bring a longer time delay to access to the terminal. Therefore, a two-step random access process is proposed. The first message msg1 and third message msg3 in the four-step random access process are transmitted through the message A msgA in the two-step random access process, and the second message msg2 and fourth message msg4 in the four-step random access process are transmitted through the message B msgB in the two-step random access process. How to design the message B msgB in the two-step random access process to realize the normal random access process is a technical problem that needs to be solved.

SUMMARY OF THE DISCLOSURE

An embodiment of the disclosure provides a random access method and apparatus, a user equipment, and a network device.

The random access method provided by the embodiment of the disclosure includes:

After the user equipment (UE) sends the first message, the scheduling instruction of the second message is detected in the first window.

The second message includes at least one of the following: a first conflict resolution identifier, a second conflict resolution identifier, first indication information, and second indication information, wherein the first conflict resolution identifier is used for conflict resolution of a connected UE; the second conflict resolution identifier is used for conflict resolution of an idle UE, an inactive UE, or the connected UE; the first indication information is used for indicating that a two-step random access process returns to a four-step random access process; and the second indication information is used for indicating a random backoff value when the UE retransmits the first message.

The random access method provided by the embodiment of the disclosure includes:

The network device receives the first message transmitted by the UE, and transmits a scheduling instruction of the second message in the first window.

The second message includes at least one of the following: a first conflict resolution identifier, a second conflict resolution identifier, first indication information, and second indication information, wherein the first conflict resolution identifier is used for conflict resolution of a connected UE, the second conflict resolution identifier is used for conflict resolution of an idle UE, an inactive UE, or the connected UE; the first indication information is used for indicating that a two-step random access process returns to a four-step random access process; and the second indication information is used for indicating a random backoff value when the UE retransmits the first message.

The random access apparatus provided in the embodiment of the disclosure is applied to a user equipment, and the apparatus includes:

A transmitting unit is configured to transmit the first message.

A receiving unit is configured to detect the scheduling instruction of the second message in the first window.

The second message includes at least one of the following: a first conflict resolution identifier, a second conflict resolution identifier, first indication information, and second indication information, wherein the first conflict resolution identifier is used for conflict resolution of a connected UE, the second conflict resolution identifier is used for conflict resolution of an idle UE, an inactive UE, or the connected UE; the first indication information is used for indicating that a two-step random access process returns to a four-step random access process; and the second indication information is used for indicating a random backoff value when the UE retransmits the first message.

The random access apparatus provided in the embodiment of the disclosure is applied to a network equipment, and the apparatus includes:

A receiving unit is configured to receive the first message transmitted by the UE.

A transmitting unit is configured to transmit the scheduling instruction of the second message in the first window.

The second message includes at least one of the following: a first conflict resolution identifier, a second conflict resolution identifier, first indication information, and second indication information, wherein the first conflict resolution identifier is used for conflict resolution of a connected UE, the second conflict resolution identifier is used for conflict resolution of an idle UE, an inactive UE, or the connected UE; the first indication information is used for indicating that a two-step random access process returns to a four-step random access process; and the second indication information is used for indicating a random backoff value when the UE retransmits the first message.

The user equipment provided in the embodiment of the disclosure includes a processor and a memory. The memory is used to store a computer program, and the processor is used to call and run the computer program stored in the memory to execute the aforementioned random access method.

The network device provided in the embodiment of the disclosure includes a processor and a memory. The memory is used to store a computer program, and the processor is used to call and run the computer program stored in the memory to execute the aforementioned random access method.

The chip provided in the embodiment of the disclosure is used to implement the aforementioned random access method.

Specifically, the chip includes: a processor, which is configured to call and run a computer program from the memory, so that the device installed with the chip executes the abovementioned random access method.

The computer-readable storage medium provided by the embodiment of the disclosure is used to store a computer program, and the computer program enables a computer to execute the abovementioned random access method.

The computer program product provided by the embodiment of the disclosure includes a computer program instruction, and the computer program instruction enables the computer to execute the random access method described above.

In the computer program provided by the embodiment of the disclosure, when the computer program is run on a computer, the computer program enables the computer to execute the random access method described above.

Through the above technical solution, the content of the second message in the two-step random access process is made clear, that is, a message B msgB format is designed to realize the normal two-step random access process. The message B msgB format provided in the embodiment of disclosure can realize conflict resolution of a connected UE, an idle UE, or an inactive UE. On the other hand, the msgB format provided in the embodiment of the disclosure can instruct the UE to return to the four-step random access process from the two-step random access process. In this way, the UE in any state only needs to blindly detect the Physical Downlink Control Channel (PDCCH) scrambled by the Random Access Radio Network Temporary Identity (RA-RNTI) in the receiving window of message B msgB, thereby saving the overhead of blindly detecting the PDCCH by the UE.

BRIEF DESCRIPTION OF THE DRAWINGS

The drawings described here are used to provide a further understanding of the disclosure and constitute a part of the disclosure. The exemplary embodiments and descriptions of the disclosure serve to explain the disclosure, and do not constitute an improper limitation of the disclosure. In the accompanying figures:

FIG. 3-1 is the first structural view of media access control (MAC) protocol data unit (PDU) embodied by an embodiment of the disclosure.

FIG. 3-2 is a structural view of E/T/R/R/backoff indication (BI) sub-header embodied by an embodiment of the disclosure.

FIG. 3-3 is a structural view of E/T/random access preamble ID (RAPID) sub-header embodied by an embodiment of the disclosure.

FIG. 3-4 is a structural view of MAC random access response (RAR) embodied by an embodiment of the disclosure.

FIG. 4 is a schematic flowchart of a random access method embodied by an embodiment of the disclosure.

FIG. 5 is a schematic view of transmission of msgA and msgB embodied by an embodiment of the disclosure.

FIG. 6-1 is the first structural view of the first MAC control element (CE) embodied by an embodiment of the disclosure.

FIG. 6-2 is the second structural view of the first MAC CE embodied by an embodiment of the disclosure.

FIG. 6-3 is a structural view of the second MAC CE embodied by an embodiment of the disclosure.

FIG. 6-4 is the first structural view of the first sub-header embodied by an embodiment of the disclosure.

FIG. 6-5 is the second structural view of the first sub-header embodied by an embodiment of the disclosure.

FIG. 6-6 is the third structural view of the first sub-header embodied by an embodiment of the disclosure.

FIG. 6-7 is the first structural view of the second sub-header embodied by an embodiment of the disclosure.

FIG. 6-8 is the second structural view of the second sub-header embodied by an embodiment of the disclosure.

FIG. 6-9 is the second structural view of MAC PDU embodied by an embodiment of the disclosure.

FIG. 6-10 is the fourth structural view of the first sub-header embodied by an embodiment of the disclosure.

FIG. 6-11 is a structural view of the third MAC CE embodied by an embodiment of the disclosure.

FIG. 7 is the first schematic view of the structural constitution of a random access apparatus embodied by an embodiment of the disclosure.

FIG. 8 is the second schematic view of the structural constitution of a random access apparatus embodied by an embodiment of the disclosure.

FIG. 9 is a schematic structural view of a communication device embodied by an embodiment of the disclosure.

FIG. 10 is a schematic structural view of a chip embodied by an embodiment of the disclosure.

FIG. 11 is a schematic block view of a communication system embodied by an embodiment of the disclosure.

DESCRIPTION OF EMBODIMENTS

The technical solutions in the embodiments of the disclosure will be described below in conjunction with the drawings in the embodiments of the disclosure. Obviously, the described embodiments are a part of the embodiments of the disclosure, not all of the embodiments. Based on the embodiments in the disclosure, all other embodiments derived by those of ordinary skill in the art without inventive effort shall fall within the scope of disclosure.

The technical solutions in the embodiments of the disclosure can be applied to various communication systems, such as: Global System of Mobile communication (GSM) system, Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD), Universal Mobile Telecommunication System (UMTS), Worldwide Interoperability for Microwave Access (WiMAX) communication system or 5G system, etc.

Figure 1:
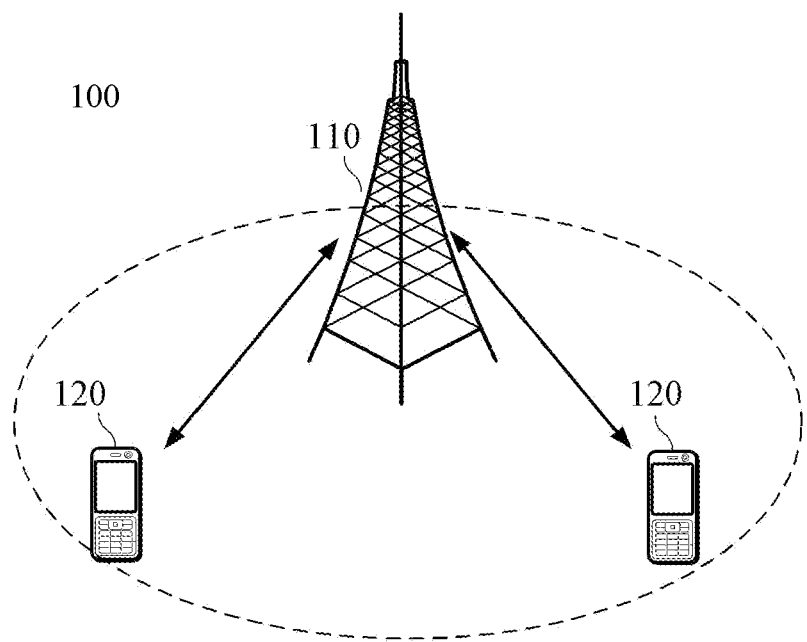
FIG. 1 is a schematic view of a communication system architecture embodied by an embodiment of the disclosure.

Exemplarily, the communication system 100 applied in the embodiment of the disclosure is shown in FIG. 1. The communication system 100 may include a network device 110, and the network device 110 may be a device that communicates with a terminal device 120 (or referred to as a communication terminal or a terminal). The network device 110 may provide communication coverage for a specific geographic area, and may communicate with terminal devices located in the coverage area. Optionally, the network device 110 may be a Base Transceiver Station (BTS) in a GSM system or a CDMA system, a base station (NodeB, NB) in a WCDMA system, an evolved base station (Evolutional Node B, eNB or eNodeB) in an LTE system, a wireless controller in the Cloud Radio Access Network (CRAN), or the network device can be a mobile switching center, a relay station, an access point, a vehicle-mounted equipment, a wearable device, a hub, a switch, a bridge, a router, a network side device in 5G networks, or a network device of a Public Land Mobile Network (PLMN) in future evolution, etc.

The communication system 100 further includes at least one terminal device 120 located within the coverage area of the network device 110. As used herein, "terminal device" includes, but is not limited to, connection via wired lines, such as via Public Switched Telephone Networks (PSTN), Digital Subscriber Line (DSL), digital cables, and direct cable connections; and/or another data connection/network; and/or via a wireless interface, such as digital TV networks such as DVB-H networks, satellite networks, AM-FM broadcast transmitter for cellular networks, Wireless Local Area Networks (WLAN); and/or another terminal device that is set to receive/send communication signals; and/or Internet of Things (IoT) device. A terminal device set to communicate through a wireless interface may be referred to as a "wireless communication terminal", a "wireless terminal" or a "mobile terminal". Examples of mobile terminals include, but are not limited to, satellite or cellular phones; Personal Communications System (PCS) terminals that can be combined with cellular radio phones with data processing, fax, and data communication capabilities; can include radio phones, pagers, Internet/intranet PDA with internet access, Web browser, memo pad, calendar, and/or PDA of Global Positioning System (GPS) receiver; as well as conventional laptop and/or palmtop receivers or other electronic devices including radio telephone transceivers. Terminal device can refer to access terminals, user equipment (UE), user units, user stations, mobile stations, mobile platforms, remote stations, remote terminals, mobile equipment, user terminals, terminals, wireless communication equipment, user agents, or user equipment. The access terminal can be a cellular phone, a cordless phone, a Session Initiation Protocol (SIP) phone, a Wireless Local Loop (WLL) station, a Personal Digital Assistant (PDA), handheld devices with wireless communication functions, computing devices, or other processing devices connected to wireless modems, in-vehicle devices, wearable devices, terminal devices in 5G networks, or terminal devices in PLMN in future evolution etc.

Optionally, Device to Device (D2D) communication may be performed between the terminal devices 120.

Optionally, the 5G system or 5G network may also be referred to as a New Radio (NR) system or an NR network.

FIG. 1 exemplarily shows one network device 110 and two terminal devices 120. Optionally, the communication system 100 may include multiple network devices 110 and the coverage of each network device 110 may include terminal devices 112 in different quantities. The disclosure provides no limitation thereto.

Optionally, the communication system 100 may further include other network entities such as a network controller and a mobile management entity, the disclosure provides no limitation thereto.

It should be understood that a device with a communication function in the network/system in the embodiment of the disclosure may be referred to as a communication device. Taking the communication system 100 shown in FIG. 1 as an example, the communication device may include a network device 110 and a terminal device 120 with a communication function. The network device 110 and the terminal device 120 may be the specific devices described above, and no further description is incorporated herein. The communication device may also include other devices in the communication system 100, such as network controllers, mobile management entities, and other network entities, the disclosure provides no limitation thereto.

It should be understood that the terms "system" and "network" used in the disclosure are often used interchangeably. The term "and/or" in the disclosure is only an association relationship describing the associated objects, which means that there can be three kinds of relationships, for example, A and/or B, which can mean three situations: A is present alone, A and B are present simultaneously, or B is present alone. In addition, the character "/" in the disclosure generally indicates that the associated objects are in an "or" relationship.

To facilitate understanding of the technical solutions of the embodiments of the disclosure, the technical concepts related to the embodiments of the disclosure are described below.

Figure 2:
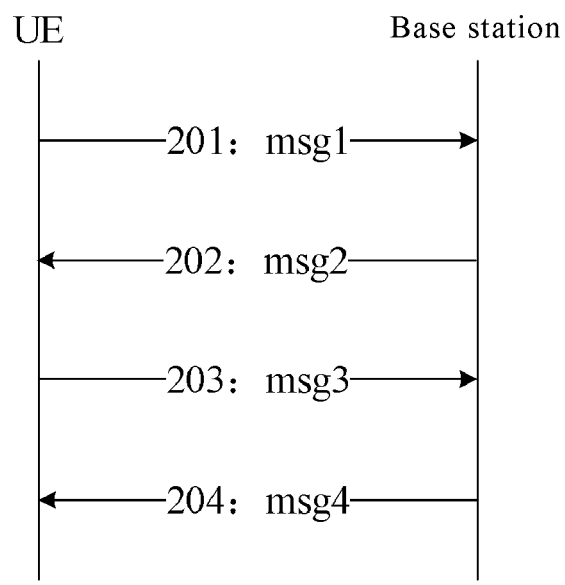
FIG. 2 is a flowchart of a four-step random access process embodied by an embodiment of the disclosure.

Random access is an important process for the UE to establish a wireless connection with the network. Through random access, uplink synchronization with the base station can be obtained, and application for uplink resources can be made. The random access process is separated into a contention-based random access process and a non-contention-based random access process. Specifically, the contention-based random access process includes a four-step random access process and a two-step random access process. FIG. 2 shows a flowchart of the four-step random access process. As shown in FIG. 2, the four-step random access process includes the following steps:

Step 201: The UE sends the first message msg1 to the base station.

Here, the step of sending the first message msg1 by the UE to the base station can be implemented specifically through the following process:

The UE determines the relationship between Synchronization Signal Block (SSB) and Physical Random Access Channel (PRACH) resources (configured by layers with higher hierarchy).

The UE receives a set of SSB and determines its Reference Signal Received Power (RSRP) value, and selects the appropriate SSB according to the threshold.

The UE determines the PRACH resource based on the selected SSB and the corresponding relationship between the SSB and the PRACH resource.

The UE sends the preamble on the PRACH time-frequency domain resource.

Step 202: The UE receives the second message msg2 sent by the base station.

Here, the step of receiving the second message msg2 sent by the base station through the UE can be implemented specifically through the following process:

The UE opens the RAR window (ra-Response Window) at occasion of the first physical downlink control channel (PDCCH) after sending the preamble, and monitors the PDCCH during the operation of the window. Specifically, PDCCH is PDCCH scrambled with RA-RNTI. RA-RNTI is related to the PRACH time-frequency resource selected by the UE. The calculation of RA-RNTI is as follows:

$$RA\text{-}RNTI = 1 + s\_id + 14 \times t\_id + 14 \times 80 \times f\_id + 14 \times 80 \times 8 \times ul\_carrier\_id$$

Specifically, s_id is the index of the first OFDM symbol of the PRACH resource (0≤s_id<14).

t_id is the index of the first time slot of the PRACH resource in the system frame (0≤t_id<80).

f_id is the index of PRACH occasion in the frequency domain (0≤f_id<8).

ul_carrier_id is the uplink (UL) carrier used for preamble index transmission.

Figures 1, 3:
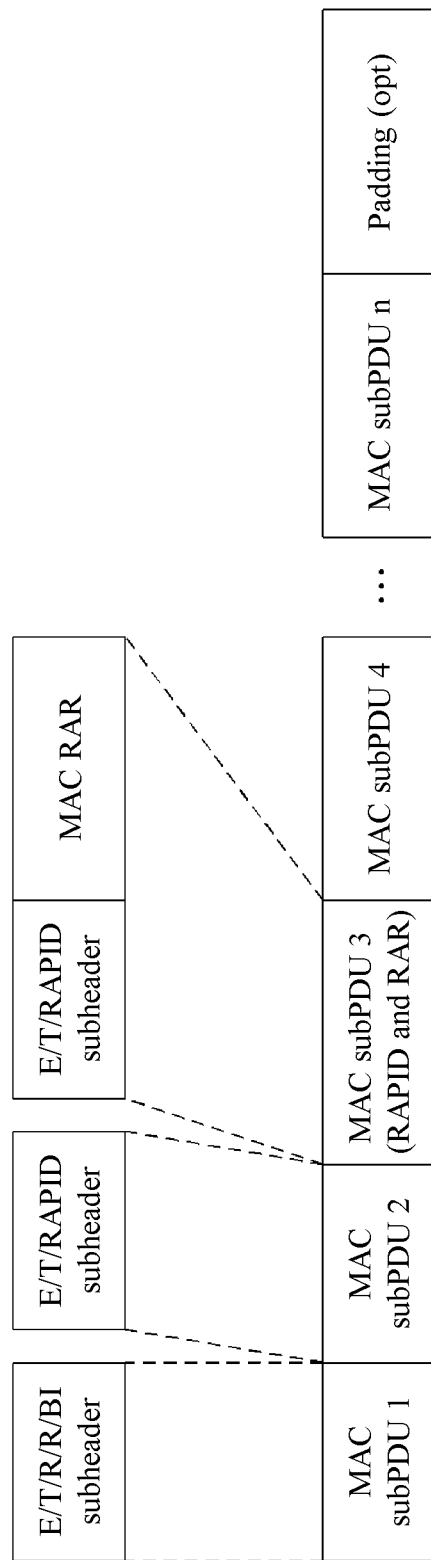
Figures 2, 3:
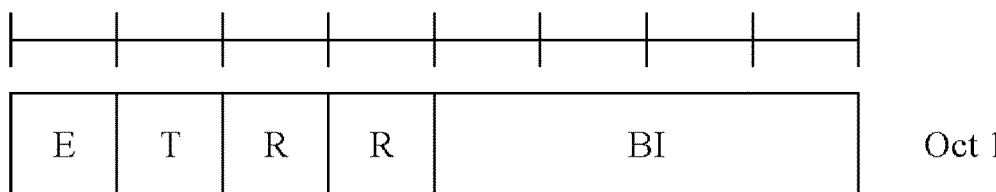
Figure 3:
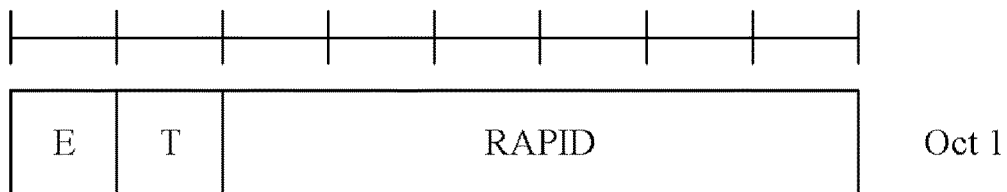
Figures 3, 4:
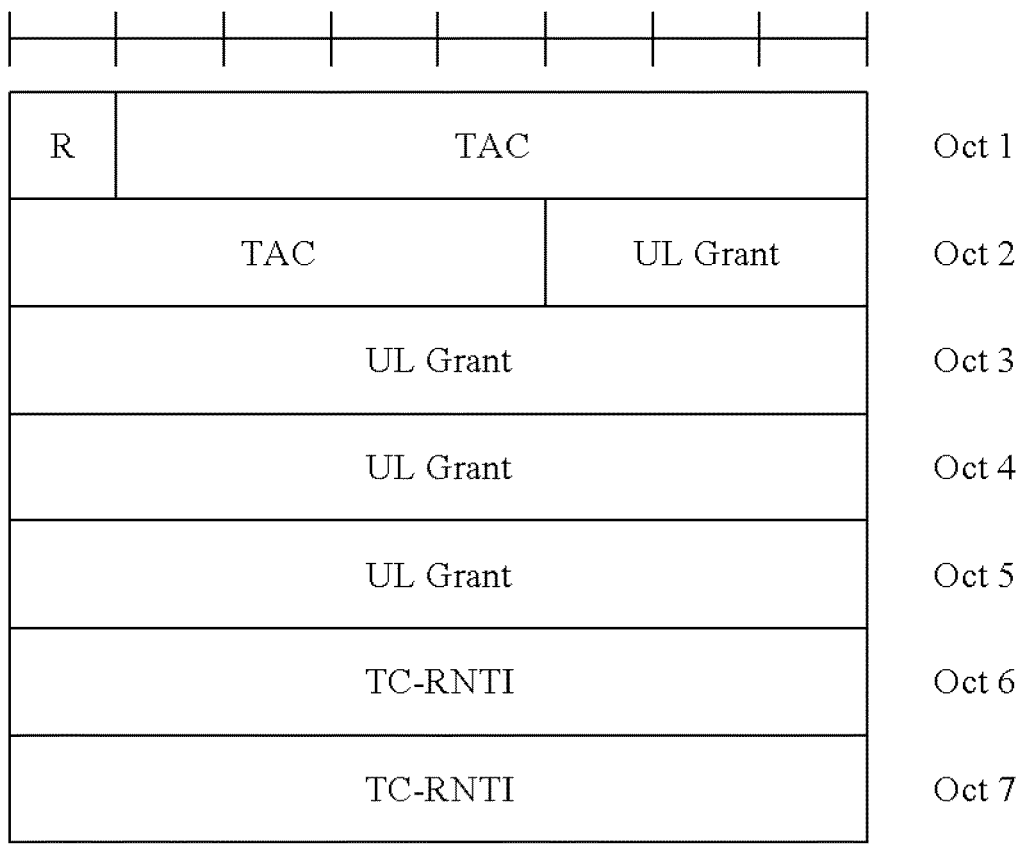

After the UE successfully monitors the PDCCH scrambled by the RA-RNTI, the Physical Downlink Shared Channel (PDSCH) scheduled by the PDCCH can be obtained, which contains the second message 2 msg2. The data format of the Media Access Control Protocol Data Unit (MAC PDU) of the second message msg2 is shown in FIG. 3-1. MAC PDU includes multiple MAC sub-PDUs (MAC sub-PDU), namely MAC sub-PDU1, MAC sub-PDU2, MAC sub-PDU3, and so on. Among them, MAC sub-PDU1 includes Backoff Indication (BI), MAC sub-PDU1 includes E/T/R/R/BI sub-header, and the structure of E/T/R/R/BI sub-header is shown in FIG. 3-2. MAC sub-PDU2 includes Random Access preamble ID (RAPID), MAC sub-PDU2 includes E/T/RAPID sub-header, and the structure of E/T/RAPID sub-header is shown in FIG. 3-3. The remaining MAC sub-PDUs (such as MAC sub-PDU3) include RAPID and Random Access Response (RAR). Take MAC sub-PDU3 as an example, MAC sub-PDU3 includes E/T/RAPID sub-header and MAC RAR, and the structure of E/T/RAPID sub-header is shown in FIG. 3-3. The structure of MAC RAR is shown in FIG. 3-4. The description of various information in FIG. 3-2 to FIG. 3-4 is as follows:

BI: Backoff indication information, which is used to indicate the backoff time for retransmission of the first message.

RAPID: The preamble index received by the network in response.

R: R represents the reserved bit area.

TAC: Timing Advance Command, which used to adjust the uplink timing.

UL Grant: Uplink Grant, which used to indicate resources for uplink transmission of the third message Msg3.

TC-RNTI: Temporary C-RNTI, which is used for the terminal to subsequently scramble the sent the third message Msg3.

Step 203: The UE sends the third message 3 msg3 to the base station.

The third message msg3 is mainly used to send UE ID to the network to resolve contention conflicts. For example, if it is the initial access random process, the hitrd message msg3 will carry the RRC layer message, that is, the common control channel (CCCH) service data unit (SDU), which contains the UE ID and the connection setup request (RRC-SetupRequest); if it is the RRC reestablishment, the third message msg3 will carry the re-establishment request (RRCRestablishmentRequest).

Step 204: The UE receives the fourth message msg4 sent by the base station.

The fourth message msg4 serves two functions. The first function is to resolve contention conflicts; the second function is to transmit RRC configuration messages to the terminal. Here, if the UE receives the DCI format 1_0 and its corresponding PDSCH scrambled by the Cell-Radio Network Temporary Identifier (C-RNTI), the random access is completed; if the terminal receives the DCI format 1_0 and its corresponding PDSCH scrambled by TC-RNTI, and the content is successfully matched, the random access is completed.

The two-step random access process is in the process of standardization and discussion, and is in the research stage.

The two-step random access process can increase the time delay and reduce the signaling overhead. At present, a basic method is that the message A msgA transmits the first message msg1 and third message msg3 of the four-step random access process, and the message B msgB transmits the second message msg2 and fourth message msg4 of the four-step random access process. To receive the message B msgB in the two-step random access process, the receiving window needs to be opened, and the UE detects the PDCCH that schedules the message B msgB within the receiving window. If the UE receives the PDCCH that schedules the message B msgB within the receiving window, the UE will receive the PDCCH according to the scheduling information in the PDCCH, and PDSCH contains the message B msgB. Considering that the message B msgB in the two-step random access process needs to contain the content of the second message msg2 and fourth message msg4, and the UE conflict resolution needs to be implemented. In view of the above, the following technical solutions in the embodiments of the disclosure are provided.

FIG. 4 is a schematic flowchart of a random access method embodied by an embodiment of the disclosure. The random access method in the embodiment of the disclosure is applied to a two-step random access process. As shown in FIG. 4, the random access method includes the following steps:

Step 401: After the UE sends the first message, the UE detects the scheduling instruction of the second message in the first window; the second message includes at least one of the following: a first conflict resolution identifier, a second conflict resolution identifier, first indication information, and second indication information, wherein the first conflict resolution identifier is used for conflict resolution of a connected UE; the second conflict resolution identifier is used for conflict resolution of an idle UE, an inactive UE, or the connected UE; the first indication information is used for indicating that a two-step random access process returns to a four-step random access process; and the second indication information is used for indicating a random backoff value when the UE retransmits the first message.

The two-step random access process includes two steps: 1) the UE sends the message A msgA to the network device; 2) the network device sends the message B msgB to the UE. In an embodiment of the disclosure, the first message is the message A msgA, and the second message is the message B msgB.

The network device mentioned in the embodiments of disclosure includes but is not limited to LTE base station (eNB) and NR base station (gNB.)

The UE mentioned in the embodiment of the disclosure may be any device capable of communicating with the network, such as a mobile phone, a notebook, a tablet computer, a vehicle-mounted terminal, and a wearable terminal.

In the embodiment of the disclosure, after the UE sends the first message (such as the message A msgA), the network device receives the first message sent by the UE. Then, the network device sends the scheduling instruction (such as PDCCH) of the second message (such as the message B msgB) in the first window, and accordingly, the UE will detect the scheduling instruction of the second message in the first window. Here, the first message includes a preamble and an uplink data channel (such as PUSCH).

Figures 1, 6:
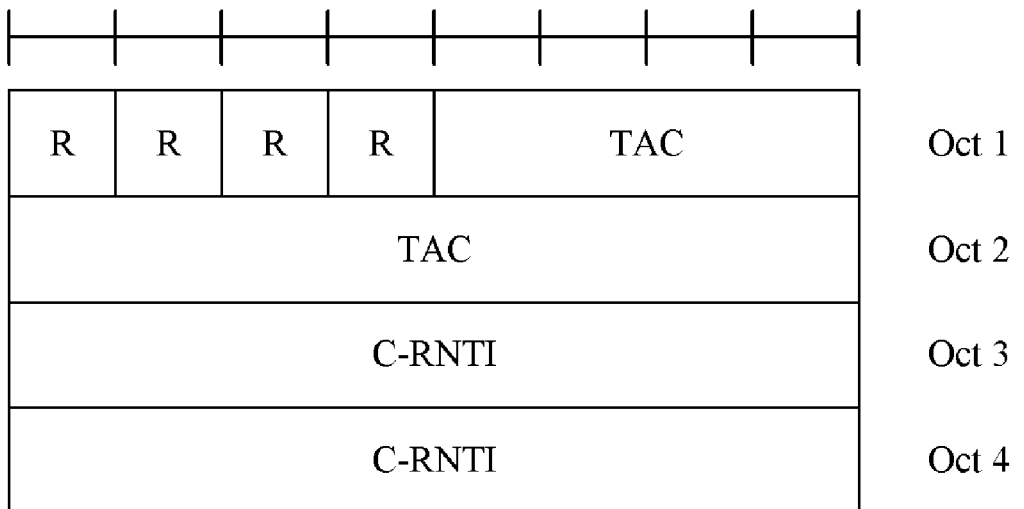
Figures 2, 6:
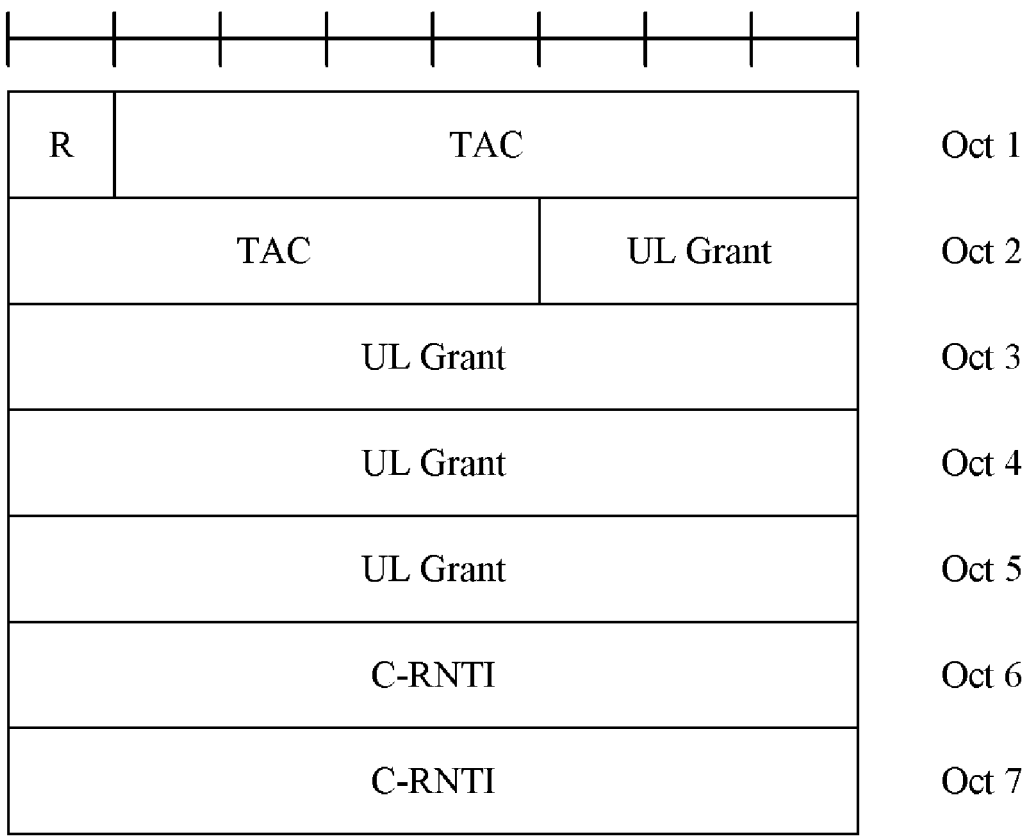
Figures 4, 6:
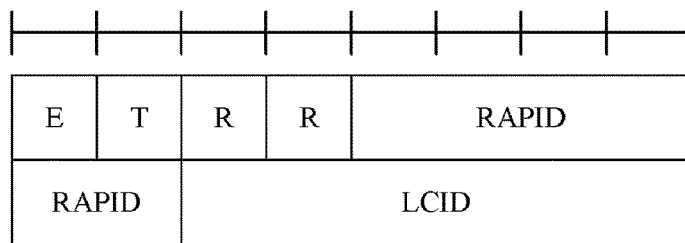
Figures 5, 6:
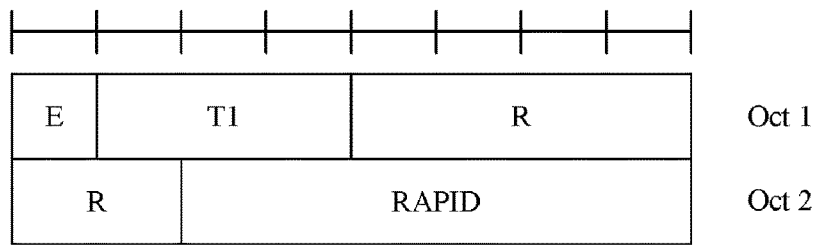
Figure 6:
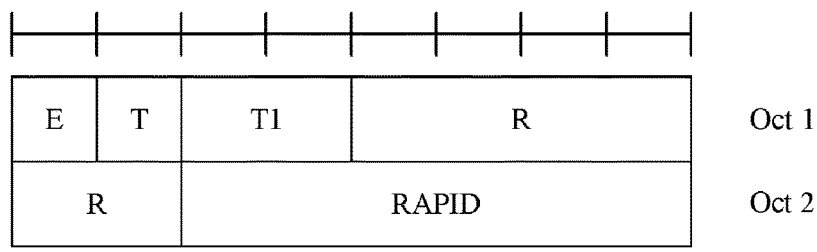

Specifically, referring to FIG. 5, in FIG. 5, the network device is exemplified as the gNB. In the two-step random access process, after the UE sends the message A msgA, the scheduling instruction of the message B msgB is blindly detected in the first window (or a timer is turned on, the scheduling instruction of the message B msgB is blindly detected during the operation period of the timer).

Specifically, the message A msgA is composed of a preamble and PUSCH, and the time when the first window starts (or the time when the timer is turned on) is after the PUSCH is sent. The UE blindly detects the PDCCH in the first window (or during the operation period of the timer). The PDCCH is scrambled by the RA-RNTI, and the calculation method of the RA-RNTI is consistent with the RA-RNTI of the RAR in the four-step random access process. It should be noted that the disclosure provides no limitation to whether the same RA-RNTI is used to blindly detect the message B msgB.

If the UE blindly detects the PDCCH scrambled by RA-RNTI in the first window (or during the operation period of timer) successfully, the UE starts to process the PDSCH scheduled by the PDCCH, which includes the message B msgB. If the UE does not blindly detect the PDCCH scrambled by RA-RNTI in the first window (or during the operation period of timer), the UE retransmits the message A msgA.

In the embodiment of the disclosure, the second message includes at least one of the following:
1) The first conflict resolution identifier, which is used for conflict resolution of a connected UE.
2) A second conflict resolution identifier, which is used for conflict resolution of an idle UE, an inactive UE, or the connected UE.
3) The first indication information, which is used to indicate that the two-step random access process returns to the four-step random access process.
4) The second indication information, which is used to indicate a random backoff value when the UE retransmits the first message msg1.

The above situation 1), 2), and 3) can be implemented through a Media Access Control Control Element (MAC CE). Specifically, the second message msg2 includes a MAC PDU, and the MAC PDU includes at least one of the following:
A first MAC CE, which carries the first conflict resolution identifier, and the first conflict resolution identifier is a cell radio network temporary identifier (Cell-RNTI, C-RNTI). Here, the first MAC CE may also be referred to as C-RNTI MAC CE.
A second MAC CE, which carries the second conflict resolution identifier (that is, contention resolution ID). Here, the second MAC CE may also be referred to as contention resolution MAC CE.
A third MAC CE, which carries RAR, and the RAR is used to indicate that the two-step random access process returns to the four-step random access process. Here, the content of the RAR may be the content of the second message msg2 in the four-step random access process, and further, a RAPID may also be added to the RAR.

Further, for the first MAC CE:
a) In an implementation of the disclosure, the first MAC CE further carries uplink timing advance information. For example: referring to FIG. 6-1, the content in the first MAC CE includes: C-RNTI and TAC. Among them, the TAC is used for the UE to adjust the uplink TA for subsequent uplink transmission, and the C-RNTI is used to resolve the contention conflict. That is, if the C-RNTI in the message B msgB received by the UE is consistent with the C-RNTI carried in the message A msgA, the conflict is considered to be resolved.
b) In another implementation of the disclosure, the first MAC CE further carries uplink timing advance information and uplink scheduling information. For example: referring to FIG. 6-2, the content in the first MAC CE includes: C-RNTI, TAC, and UL grant. It should be noted that the positions of these contents in the first MAC CE can be changed. This embodiment only serves as an example. The first MAC CE of this format is directed to the random access process that is triggered in the following conditions:
When the uplink synchronization state is "non-synchronised", uplink data is reached during the RRC connection state.
When there is no PUCCH resource for transmission scheduling request (SR), uplink data is reached during the RRC connected state.
SR is failed.

Further, for the second MAC CE: the second MAC CE further carries uplink timing advance information and C-RNTI. For example: referring to FIG. 6-3, the content in the second MAC CE includes: Contention Resolution ID, TAC, and C-RNTI. Among them, TAC uses the UE to adjust the uplink TA for subsequent uplink transmission; C-RNTI is used for PDCCH scrambling for subsequent data scheduling; Contention Resolution ID is used for conflict resolution, that is, if the Contention Resolution ID in the message B msgB received by the UE matches the CCCH SDU carried in the message A msgA, it is considered that the conflict is resolved.

It should be noted that in the connection state, the UE initiates an RRC reestablishment to trigger random access. Under the circumstances, the conflict resolution is also implemented through the second conflict resolution identifier, but in this scenario, the UE is in the connection state.

Further, for the third MAC CE:
a) In an implementation of the disclosure, the RAR in the third MAC CE includes uplink timing advance information (such as TAC), uplink scheduling information (such as UL grant), and temporary cell radio network temporary identifier (TC-RNTI). For the third MAC CE, its format is the same as the MAC RAR format in the second message msg2 in the four-step random access process. For the specific format, please refer to FIG. 3-4. The content includes: TAC, UL Grant, and TC-RNTI.
b) In another implementation of the disclosure, the RAR in the third MAC CE includes uplink timing advance information (such as TAC), uplink scheduling information (such as UL grant), TC-RNTI, and RAPID. For the third MAC CE, the specific format is shown in FIG. 6-11, and the content includes: TAC, UL Grant, TC-RNTI, and RAPID. The main purpose of carrying RAPID in the third MAC CE is to make its corresponding first sub-header only contain 1 byte, which is consistent with the size of other sub-headers. Please refer to the description in the second extended solution below.

For the condition 4) described above, the second indication information is BI information, which is used to indicate a random backoff value when the UE retransmits the first message. That is, for those UEs whose network device does not detect the message A msgA, it is necessary to perform a backoff operation according to the BI to reduce conflicts.

In the embodiment of the disclosure, the conditions 1), 2), 3), and 4) described above can be carried in the second message in any combination.

For example: the message B msgB can contain conditions 3) and 4). This situation corresponds to the situation that the network device does not detect any corresponding PUSCH (i.e., payload) at a certain random access occasion (RO), but only detects one or some preambles. Under the circumstances, the network device can make the UEs to return to the four-step random access process by means of returning to the four-step random access process.

For example: the message B msgB may contain 1), 3) and 4).

For example: the message B msgB may contain 2), 3) and 4).

For example: the message B msgB may contain 1), 2), 3) and 4).

It should be noted that the BI information may or may not be included in the message B msgB.

The content contained in the MAC PDU will be described in detail below with reference to the specific implementation of the MAC PDU of the second message.

I) The MAC PDU includes multiple first MAC sub-PDUs, the first MAC sub-PDU includes a first sub-header and a target MAC CE. The first sub-header carries the third indication information, and the third indication information is used to indicate the type of the target MAC CE, and the type of the target MAC CE refers to the first MAC CE, or the second MAC CE, or the third MAC CE.

In an embodiment, the first sub-header carries RAPID.

The message B msgB can be detected by multiple UEs by using the same RO, so RAPID is still required to instruct and select UEs with different preambles, that is, when the UE detects the message B msgB, the UE will look up the RAPID in the first sub-header according to the preamble index used in the message A msgA, so as to see if the RAPID matches the preamble index in the message A msgA.

In an embodiment, the first sub-header carries the third indication information, and the third indication information is used to indicate the type of the target MAC CE. Further, the third indication information can be implemented in the following manner:

Method 1: The third indication information is LCD, and the LCID is used to indicate the type of the target MAC CE.

For example: referring to FIG. 6-4, the content contained in the first sub-header includes RAPID and LCID, wherein LCID is used to indicate different types of MAC CE.

Method 2: The third indication information is the first type information, and the first type information is used to indicate the type of the target MAC CE and/or the type of the sub-header. Here, there are two types of sub-headers, namely, the first sub-header and the second sub-header. Specifically, the first sub-header refers to the BI sub-header, and the content contained in the BI sub-header includes the first type information and BI information; the second sub-header refers to a sub-header that only contains the first type information. Further, the second sub-header may or may not contain RAPID. For the first sub-header, the first type information carried in the first sub-header is used to indicate the type of the target MAC CE corresponding to the first sub-header and/or the type of the first sub-header.

For example, the first type information T1 can indicate four different types by using 3 bits. Certainly, the number of bits that are actually used depends on the number of different types of MAC CEs that need to be indicated. Take the first type information including 3 bits as an example, the indicated type is shown in Table 1 below:

TABLE 1

| | |
|---|---|
| 000 | Third MAC CE (see FIG. 3-4) |
| 001 | First MAC CE (Format 1, see FIG. 6-1) |
| 010 | First MAC CE (Format 2, see FIG. 6-2) |
| 011 | Second MAC CE (see FIG. 6-3) |
| 100 | Padding |
| 101 | BI sub-header |

For example: referring to FIG. 6-5, the content of the first sub-header contains RAPID and the first type information T1, wherein the first type information T1 is used to indicate different types of MAC CE, and the first type information T1 in FIG. 6-5 contains 3 bits.

For example: referring to FIG. 6-6, in order to be compatible with the four-step random access process, the content of the first sub-header includes RAPID, the second type information T, and the first type information T1, wherein the second type information T is used to indicate whether the first sub-header contains RAPID or BI information, and the first type information T1 is used to indicate different types of MAC CE. The first type information T1 in FIG. 6-6 contains 2 bits and can only indicate four types of different MAC CE at maximum.

II) The MAC PDU further includes a second MAC sub-PDU. The second MAC sub-PDU includes only a second sub-header, the second sub-header carries the second indication information, and the second indication information is BI information.

Further, the second sub-header further carries first type of information, wherein the first type information is used to indicate the type of the target MAC CE and/or the type of the sub-header. For the second sub-header, the first type information carried in the second sub-header is used to indicate the type of the second sub-header (that is, the BI sub-header).

Further, the second sub-header further carries the second type information, and the second type information is used to indicate whether the second sub-header contains RAPID or BI information.

Figures 6, 7:
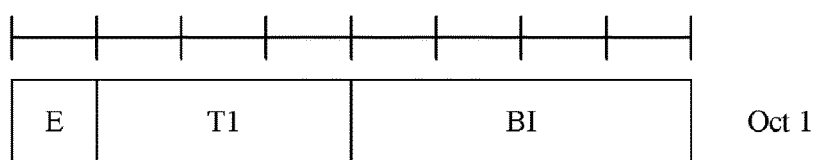

For example: referring to FIG. 6-7, the content of the second sub-header includes BI and the first type information T1. Here, the first type information T1 is used to indicate that the second sub-header contains BI information. The first type information T1 in FIG. 6-7 contains 3 bits.

Figures 6, 7, 8:
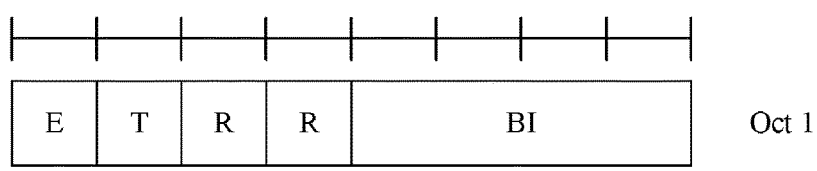

For example: referring to FIG. 6-8, in order to be compatible with the four-step random access process, the content of the second sub-header includes BI and the second type information T. Here, the second type information T is used to indicate that the second sub-header includes BI information. The second type information T in FIG. 6-8 contains 1 bit.

Specifically, the data format of MAC PDU of the message B msgB is shown in FIG. 6-9. The MAC PDU includes multiple MAC sub-PDUs (MAC sub-PDU), namely MAC sub-PDU1, MAC sub-PDU2, MAC sub-PDU3, and so on. Specifically, the MAC sub-PDU1 includes a second sub-header, and the format of the second sub-header is shown in FIG. 6-7 or FIG. 6-8. Other MAC sub-PDUs other than MAC sub-PDU1, for example, MAC sub-PDU2 includes a first sub-header and a target MAC CE. The target MAC CE may be the aforementioned first MAC CE, or the second MAC CE, or the third MAC CE. The format parameters of the first sub-header are shown in FIG. 6-4 or FIG. 6-5 or FIG. 6-6.

In the embodiment of the disclosure, for the design of the sub-header of the MAC PDU of the message B msgB, the following extended solution may also be adopted.

Solution 1:

The second sub-header (that is, the sub-header that carries BI) contains 1 byte (refer to FIG. 6-7), the first sub-header of the first MAC CE and the second MAC CE contains 1 byte (refer to FIG. 6-10), and the first sub-header of the third MAC CE contains 2 bytes (refer to FIG. 6-5).

Here, in the case of the first MAC CE and the second MAC CE, since the UE can determine whether or not the MAC sub-PDU belongs to itself through the contention conflict resolution ID, there is no need to carry RAPID in the sub-header, refer to FIG. 6-10. The first sub-header of the first MAC CE and the second MAC CE only contains the first type information T1. A value of the first type information T1 is shown in Table 2 below:

TABLE 2

| | |
|---|---|
| 000 | BI sub-header |
| 001 | First MAC CE (Format 1, see FIG. 6-1) |
| 010 | First MAC CE (Format 2, see FIG. 6-2) |
| 011 | Second MAC CE (see FIG. 6-3) |
| 100 | Third MAC CE (see FIG. 3-4) |
| 101 | Padding |

The advantageous effect of the solution 1 is that it can save 1 byte of overhead for the sub-header. If there are more first MAC CE or second MAC CE responding to different UEs, the UE needs to try many MAC sub-PDUs to find its own MAC sub-PDU.

Solution 2

On the basis of the above solution 1, for the design of the sub-header, a sub-header can be designed in the manner that all sub-headers are 1 byte. That is, for the first sub-header of the third MAC CE, the RAPID in the first sub-header can be moved to the third MAC CE. Specifically, the second sub-header (that is, the sub-header carrying BI) contains 1 byte (refer to FIG. 6-7), and the first sub-header of the first MAC CE, the second MAC CE, and the third MAC CE contains 1 byte (refer to FIG. 6-10). Correspondingly, the format of the third MAC CE needs to be modified as shown in FIG. 6-11, and the content includes: TAC, UL Grant, TC-RNTI, and RAPID. The value of the first type information T1 in FIG. 6-10 is shown in Table 3 below:

TABLE 3

| | |
|---|---|
| 000 | BI sub-header |
| 001 | First MAC CE (Format 1, see FIG. 6-1) |
| 010 | First MAC CE (Format 2, see FIG. 6-2) |
| 011 | Second MAC CE (see FIG. 6-3) |
| 100 | Third MAC CE (see FIG. 6-10) |
| 101 | Padding |

Solution 3

On the basis of the above solution 1, for the design of the sub-header, a sub-header can be designed in the manner that all sub-headers are 1 byte. Specifically, the third MAC CE in the message B msgB is sent in another PDSCH. To be specific, the second sub-header (that is, the sub-header carrying BI) contains 1 byte (refer to FIG. 6-7), and the first sub-header of the first MAC CE and the second MAC CE contains 1 byte (refer to FIG. 6 10). The value of T1 in FIG. 6-10 is shown in Table 4 below:

TABLE 4

| | |
|---|---|
| 000 | BI sub-header |
| 001 | First MAC CE (Format 1, see FIG. 6-1) |

TABLE 4-continued

| | |
|---|---|
| 010 | First MAC CE (Format 2, see FIG. 6-2) |
| 011 | Second MAC CE (see FIG. 6-3) |
| 101 | Padding |

After the format of MAC PDU of the message B msgB is designed through the above solution, the embodiment of the disclosure further specifies the behavior of two types of UE upon receiving the MAC PDU, which can be classified into:

I) The First Type of UE: A Connected UE

The UE at least transmits the fourth MAC CE in the uplink data channel of the first message, and the fourth MAC CE carries a C-RNTI. That is: the connected UE will transmit the C-RNTI MAC CE in the PUSCH of the message A msgA.

After transmitting the first message, the first type of UE receives the scheduling instruction of the second message in the first window/timer. If the UE receives the scheduling instruction of the second message in the first window, then the UE determines whether the MAC PDU contains the first MAC CE and/or the third MAC CE through the third indication information carried in the MAC PDU of the second message, wherein:

If the MAC PDU contains the first MAC CE, and the C-RNTI in the first MAC CE is consistent with the C-RNTI in the first message, the conflict is resolved.

It should be noted that there may not be the first MAC CE in the MAC PDU. In this case, the conflict resolution of the UE is implemented by receiving the PDCCH scrambled by the C-RNTI. Specifically, if there is no third MAC CE in the second message received by the UE, the UE continues to blindly detect whether there is a PDCCH scrambled by the C-RNTI. That is to say, the first type of UE not only needs to blindly detect the PDCCH scrambled by the RA-RNTI but also detects the PDCCH scrambled by the C-RNTI, wherein the PDCCH scrambled by the C-RNTI is used for conflict resolution.

If the MAC PDU contains a third MAC CE, and the RAPID contained in the third MAC CE or the RAPID in the first sub-packet header corresponding to the third MAC CE is consistent with the index information of the preamble in the first message, the UE returns to the four-step random access process from the two-step random access process.

If the MAC PDU does not include the first MAC CE and the third MAC CE, the UE retransmits the first message after the first window ends, wherein the retransmission of the first message adopts the BI value in the second message for backoff.

II) The Second Type of UE: An Idle UE, an Inactive UE, or a Connected UE

The UE transmits the CCCH SDU in the uplink data channel of the first message. That is: the idle UE, the inactive UE, or the connected UE will transmit the CCCH SDU in the new PUSCH of the message A msgA.

After the second type of UE transmits the first message, the UE receives the scheduling instruction of the second message in the first window/timer. If the UE receives the scheduling instruction of the second message in the first window, then the UE determines whether the MAC PDU contains the second MAC CE and/or the third MAC CE according to the third indication information carried in the MAC PDU of the second message, wherein:

If the MAC PDU contains a second MAC CE, and the second conflict resolution identifier in the second MAC CE matches the CCCH SDU in the first message, the conflict is resolved.

If the MAC PDU contains a third MAC CE, and the RAPID contained in the third MAC CE or the RAPID in the first sub-packet header corresponding to the third MAC CE is consistent with the index information of the preamble in the first message, the UE returns to the four-step random access process from the two-step random access process.

If the MAC PDU does not include the second MAC CE and the third MAC CE, the UE retransmits the first message after the first window ends, wherein the retransmission of the first message adopts the BI value in the second message for backoff.

FIG. 7 is the first schematic view of the structural constitution of a random access apparatus embodied by an embodiment of the disclosure. The random access apparatus is applied to a user equipment, and the apparatus includes:

The transmitting unit 701 is configured to transmit the first message.

The receiving unit 702 is configured to detect the scheduling instruction of the second message in the first window.

The second message includes at least one of the following: a first conflict resolution identifier, a second conflict resolution identifier, first indication information, and second indication information, wherein the first conflict resolution identifier is used for conflict resolution of a connected UE; the second conflict resolution identifier is used for conflict resolution of an idle UE, an inactive UE, or the connected UE; the first indication information is used for indicating that a two-step random access process returns to a four-step random access process; and the second indication information is used for indicating a random backoff value when the UE retransmits the first message.

In an embodiment, the first message includes a preamble and an uplink data channel.

In an embodiment, the second message includes a MAC PDU, and the MAC PDU includes at least one of the following:

A first MAC CE, which carries the first conflict resolution identifier, and the first conflict resolution identifier is C-RNTI.

A second MAC CE, which carries the second conflict resolution identifier.

A third MAC CE, which carries RAR, and the RAR is used to indicate that the two-step random access process returns to the four-step random access process.

In an embodiment, the first MAC CE further carries uplink timing advance information.

In an embodiment, the first MAC CE further carries uplink timing advance information and uplink scheduling information.

In an embodiment, the second MAC CE further carries uplink timing advance information and C-RNTI.

In an embodiment, the RAR includes uplink timing advance information, uplink scheduling information, and TC-RNTI.

In an embodiment, the RAR includes uplink timing advance information, uplink scheduling information, TC-RNTI, and RAPID.

In an embodiment, the MAC PDU includes multiple first MAC sub-PDUs, the first MAC sub-PDU includes a first sub-header and a target MAC CE, and the first sub-header carries the third indication information. The third indication information is used to indicate the type of the target MAC CE, and the type of the target MAC CE refers to the first MAC CE, or the second MAC CE, or the third MAC CE.

In an embodiment, the third indication information is LCID, and the LCID is used to indicate the type of the target MAC CE.

In an embodiment, the third indication information is the first type information, and the first type information is used to indicate the type of the target MAC CE and/or the type of the first sub-header.

In an embodiment, the first sub-header further carries RAPID.

In an embodiment, the first sub-header further carries the second type information, and the second type information is used to indicate whether the first sub-header contains RAPID or BI information.

In an embodiment, the MAC PDU further includes a second MAC sub-PDU, the second MAC sub-PDU only includes a second sub-header, the second sub-header carries the second indication information, and the second indication information is BI information.

In an embodiment, the second sub-header further carries the first type information, and the first type information is used to indicate the type of the second sub-header.

In an embodiment, the second sub-header further carries the second type information, and the second type information is used to indicate whether the second sub-header contains RAPID or BI information.

In an embodiment, in the condition that the user equipment is a connected UE,

The transmitting unit 701 at least transmits the fourth MAC CE in the uplink data channel of the first message, and the fourth MAC CE carries a C-RNTI.

In an embodiment, the apparatus further includes:

The determining unit 703 is configured to determine whether the MAC PDU contains the first MAC CE and/or the third MAC CE according to the third indication information carried in the MAC PDU of the second message if the receiving unit receives the scheduling instruction of the second message in the first window.

In an embodiment, the apparatus further includes a processing unit 704, which is configured to:

If the MAC PDU contains the first MAC CE, and the C-RNTI in the first MAC CE is consistent with the C-RNTI in the first message, the conflict is resolved.

If the MAC PDU includes a third MAC CE, and the RAPID contained in the third MAC CE or the RAPID in the first sub-packet header corresponding to the third MAC CE is consistent with the index information of the preamble in the first message, the UE returns to the four-step random access process from the two-step random access process.

If the MAC PDU does not include the first MAC CE and the third MAC CE, the first message is retransmitted after the first window ends, wherein the retransmission of the first message adopts the BI value in the second message for backoff.

In an embodiment, in the condition that the user equipment is an idle UE, an inactive UE, or the connected UE, the transmitting unit 701 transmits the CCCH SDU in the uplink data channel of the first message.

In an embodiment, the apparatus further includes:

The determining unit 703 is configured to determine whether the MAC PDU contains the second MAC CE and/or the third MAC CE according to the third indication information carried in the MAC PDU of the second message if the receiving unit receives the scheduling instruction of the second message in the first window.

In an embodiment, the apparatus further includes a processing unit 704, which is configured to:

If the MAC PDU includes a second MAC CE, and the second conflict resolution identifier in the second MAC CE matches the CCCH SDU in the first message, then the conflict is resolved.

If the MAC PDU includes a third MAC CE, and the RAPID contained in the third MAC CE or the RAPID in the first sub-packet header corresponding to the third MAC CE is consistent with the index information of the preamble in the first message, the UE returns to the four-step random access process from the two-step random access process.

If the MAC PDU does not include the second MAC CE and the third MAC CE, the first message is retransmitted after the first window ends, wherein the retransmission of the first message adopts the BI value in the second message for backoff.

Those skilled in the art should understand that the relevant description of the foregoing random access apparatus in the embodiment of the disclosure can be understood with reference to the relevant description of the random access method in the embodiment of the disclosure.

FIG. 8 is the second schematic view of the structural constitution of a random access apparatus embodied by an embodiment of the disclosure. The random access apparatus is applied to network device, and the apparatus includes:

The receiving unit 801 is configured to receive the first message transmitted by the UE.

The transmitting unit 802 is configured to transmit the scheduling instruction of the second message in the first window.

The second message includes at least one of the following: a first conflict resolution identifier, a second conflict resolution identifier, first indication information, and second indication information, wherein the first conflict resolution identifier is used for conflict resolution of a connected UE; the second conflict resolution identifier is used for conflict resolution of an idle UE, an inactive UE, or the connected UE; the first indication information is used for indicating that a two-step random access process returns to a four-step random access process; and the second indication information is used for indicating a random backoff value when the UE retransmits the first message.

In an embodiment, the first message includes a preamble and an uplink data channel.

In an embodiment, the second message includes a MAC PDU, and the MAC PDU includes at least one of the following:

A first MAC CE, which carries the first conflict resolution identifier, and the first conflict resolution identifier is C-RNTI.

A second MAC CE, which carries the second conflict resolution identifier.

A third MAC CE, which carries RAR that responds to random access, and the RAR is used to indicate that the two-step random access process returns to the four-step random access process.

In an embodiment, the first MAC CE further carries uplink timing advance information.

In an embodiment, the first MAC CE further carries uplink timing advance information and uplink scheduling information.

In an embodiment, the second MAC CE further carries uplink timing advance information and C-RNTI.

In an embodiment, the RAR includes uplink timing advance information, uplink scheduling information, and TC-RNTI.

In an embodiment, the RAR includes uplink timing advance information, uplink scheduling information, TC-RNTI, and RAPID.

In an embodiment, the MAC PDU includes multiple first MAC sub-PDUs, the first MAC sub-PDU includes a first sub-header and a target MAC CE, and the first sub-header carries the third indication information. The third indication information is used to indicate the type of the target MAC CE, and the type of the target MAC CE refers to the first MAC CE, or the second MAC CE, or the third MAC CE.

In an embodiment, the third indication information is LCID, and the LCID is used to indicate the type of the target MAC CE and/or the type of the first sub-header.

In an embodiment, the third indication information is the first type information, and the first type information is used to indicate the type of the target MAC CE.

In an embodiment, the first sub-header further carries RAPID.

In an embodiment, the first sub-header further carries the second type information, and the second type information is used to indicate whether the first sub-header contains RAPID or BI information.

In an embodiment, the MAC PDU further includes a second MAC sub-PDU, the second MAC sub-PDU only includes a second sub-header, the second sub-header carries the second indication information, and the second indication information is BI information.

In an embodiment, the second sub-header further carries the first type information, and the first type information is used to indicate the type of the second sub-header.

In an embodiment, the second sub-header further carries the second type information, and the second type information is used to indicate whether the second sub-header contains RAPID or BI information.

Those skilled in the art should understand that the relevant description of the foregoing random access apparatus in the embodiment of the disclosure can be understood with reference to the relevant description of the random access method in the embodiment of the disclosure.

Figures 6, 7, 8, 9:
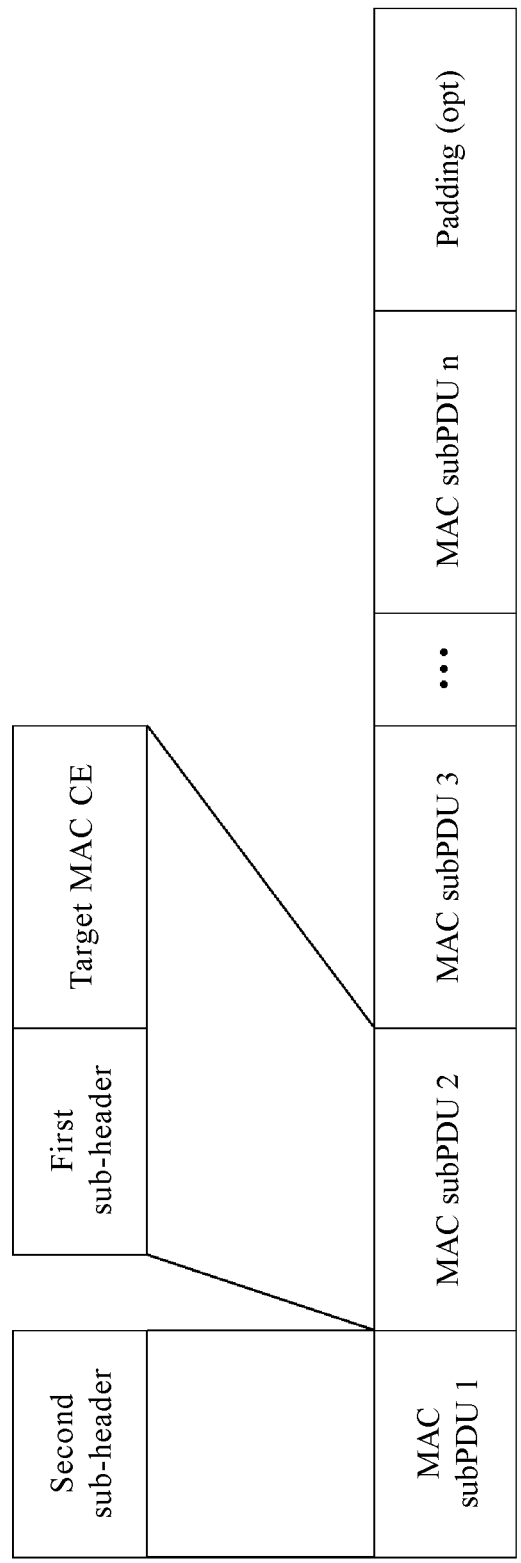

FIG. 9 is a schematic structural view of a communication device 600 embodied by an embodiment of the disclosure. The communication device may be a user equipment or a network device. The communication device 600 shown in FIG. 9 includes a processor 610, and the processor 610 can call and run a computer program from a memory to implement the method in the embodiment of the disclosure.

Optionally, as shown in FIG. 9, the communication device 600 may further include a memory 620. The processor 610 may call and run a computer program from the memory 620 to implement the method in the embodiment of the disclosure.

The memory 620 may be a separate device independent of the processor 610, or may be integrated in the processor 610.

Optionally, as shown in FIG. 9, the communication device 600 may further include a transceiver 630, and the processor 610 may control the transceiver 630 to communicate with other devices. Specifically, the transceiver 630 may send information or data to other devices, or receive information or data sent by other devices.

Specifically, the transceiver 630 may include a transmitter and a receiver. The transceiver 630 may further include an antenna, and the number of antennas may be one or more.

Optionally, the communication device 600 may specifically be a network device in an embodiment of the disclosure, and the communication device 600 may implement the corresponding process implemented by the network device in various methods of the embodiment of the disclosure. For the conciseness, related descriptions are omitted.

Optionally, the communication device 600 may specifically be a mobile terminal/terminal device in an embodiment of the disclosure, and the communication device 600 may implement the corresponding process implemented by the mobile terminal/terminal device in various methods in the embodiment of the disclosure. For conciseness, related description is omitted.

Figures 6, 7, 8, 9, 10:
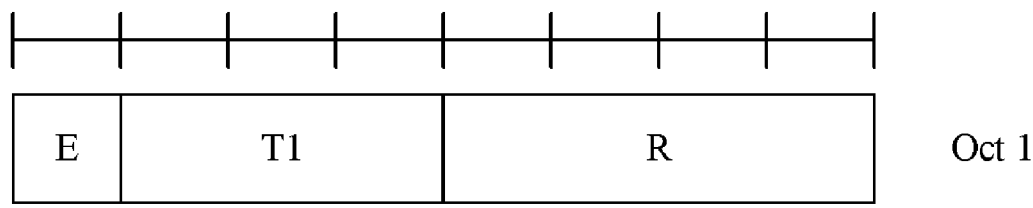

FIG. 10 is a schematic structural view of a chip embodied by an embodiment of the disclosure. The chip 700 shown in FIG. 10 includes a processor 710, and the processor 710 can call and run a computer program from the memory to implement the method in the embodiment of the disclosure.

Optionally, as shown in FIG. 10, the chip 700 may further include a memory 720. The processor 710 may call and run a computer program from the memory 720 to implement the method in the embodiment of the disclosure.

The memory 720 may be a separate device independent of the processor 710, or may be integrated in the processor 710.

Optionally, the chip 700 may further include an input interface 730. The processor 710 can control the input interface 730 to communicate with other devices or chips, and specifically, can obtain information or data sent by other devices or chips.

Optionally, the chip 700 may further include an output interface 740. The processor 710 can control the output interface 740 to communicate with other devices or chips, and specifically, can output information or data to other devices or chips.

Optionally, the chip can be applied to the network device in the embodiment of the disclosure, and the chip can implement the corresponding process implemented by the network device in various methods in the embodiment of the disclosure. For conciseness, related details are omitted.

Optionally, the chip can be applied to the mobile terminal/terminal device in the embodiment of disclosure, and the chip can implement the corresponding process implemented by the mobile terminal/terminal device in various methods in the embodiment of the disclosure. For conciseness, related details are omitted.

It should be understood that the chip mentioned in the embodiment of the disclosure may also be referred to as a system-level chip, a system chip, a chip system, or a system-on-chip, etc.

Figures 6, 7, 8, 9, 10, 11:
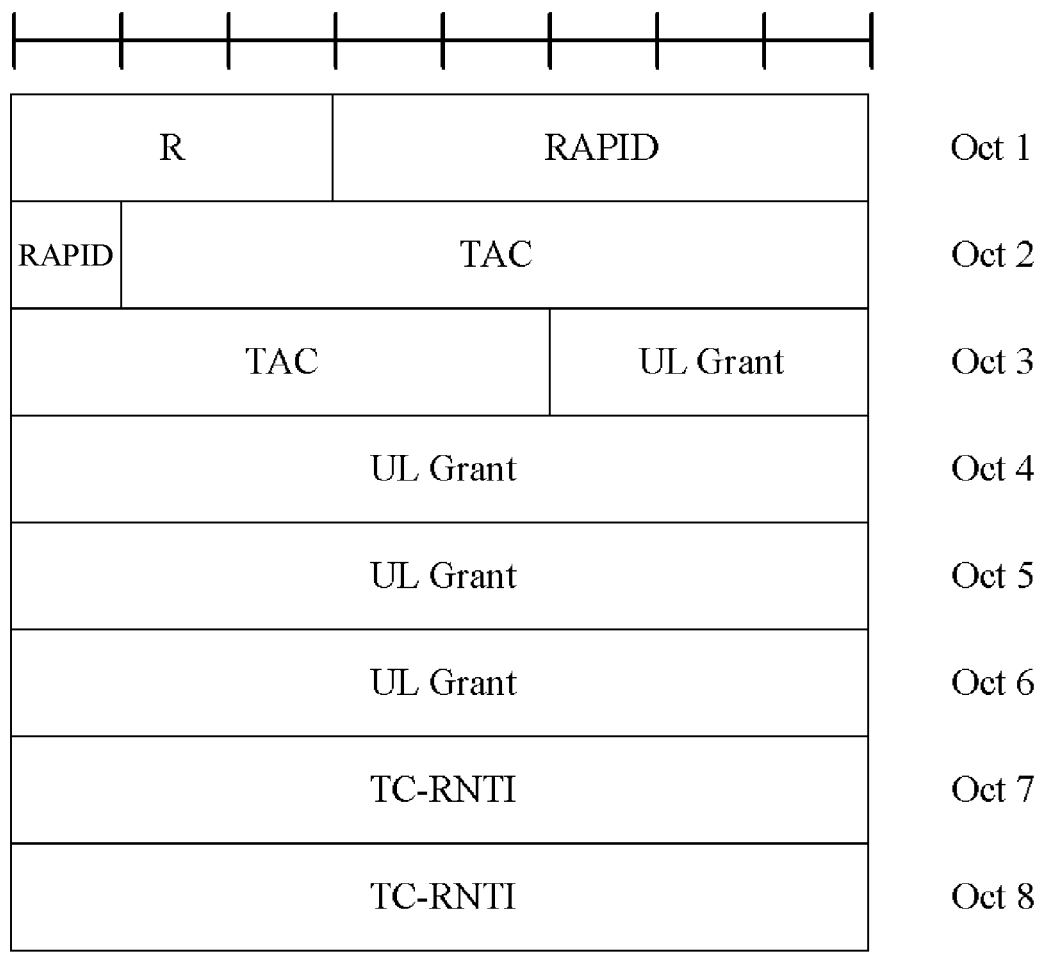
Figure 7:
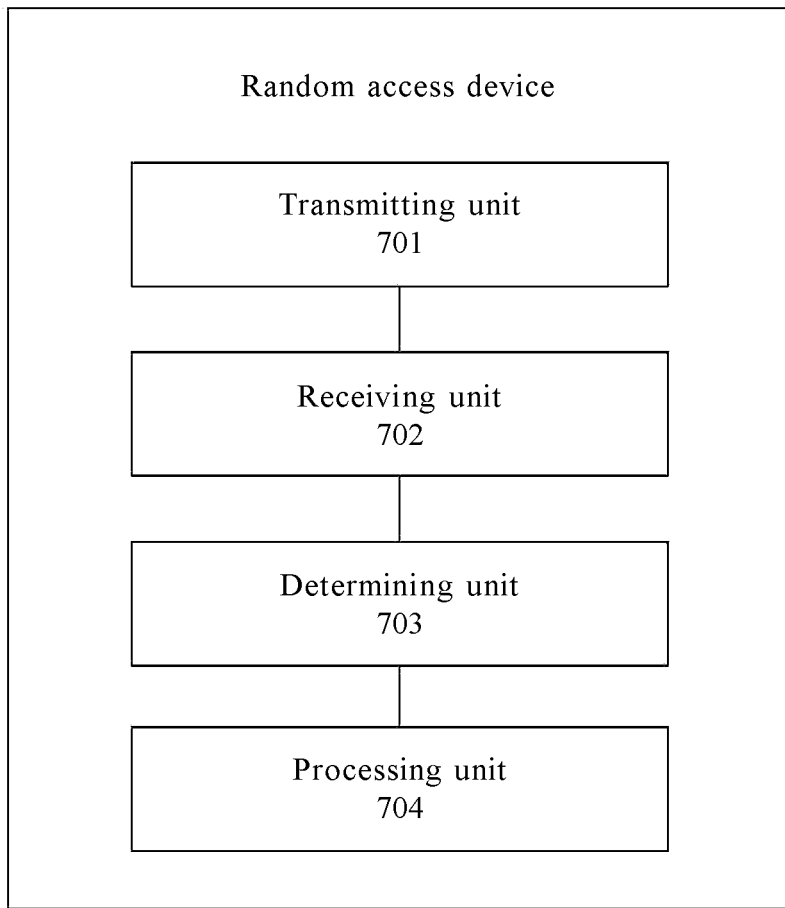
Figure 8:
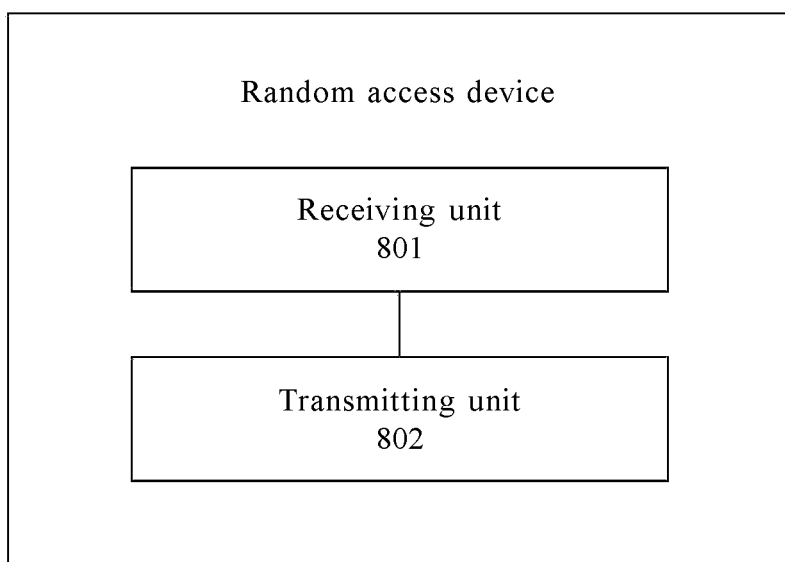
Figure 9:
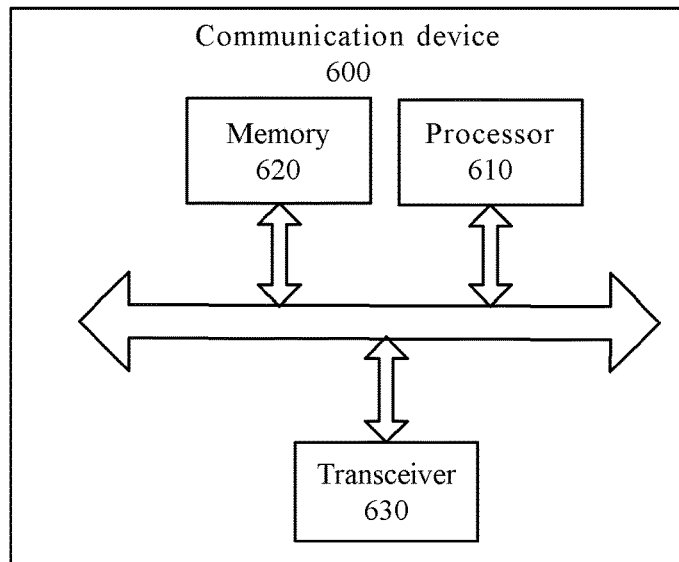
Figure 10:
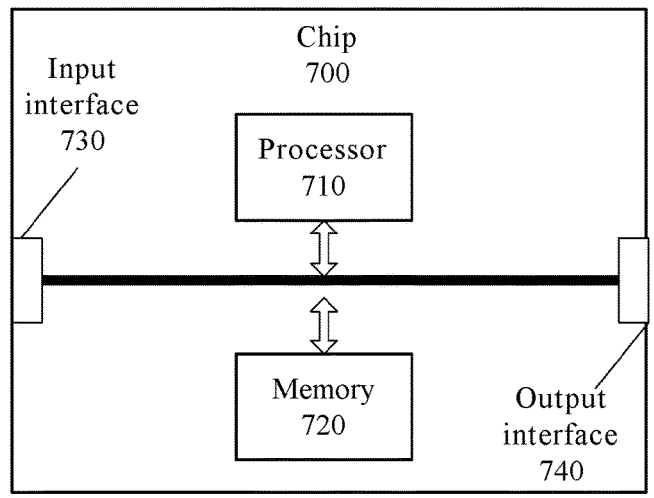
Figure 11:
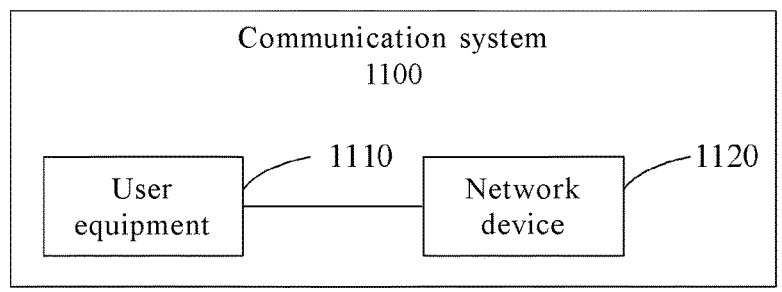

FIG. 11 is a schematic block view of a communication system 1100 embodied by an embodiment of the disclosure. As shown in FIG. 11, the communication system 1100 includes a user equipment 1110 and a network device 1120.

Specifically, the user equipment 1110 can be used to implement the corresponding functions implemented by the terminal device in the above method, and the network device 1120 can be used to implement the corresponding functions implemented by the network device in the above method. For conciseness, related description is omitted.

It should be understood that the processor in the embodiment of the disclosure may be an integrated circuit chip with signal processing capability. In the implementation process, the steps of the foregoing method embodiments can be completed by integrated logic circuits of hardware in the processor or instructions in the form of software. The processor can be a general-purpose processor, a Digital Signal Processor (DSP), an Application Specific Integrated Circuit (ASIC), a ready-made Field Programmable Gate Array (FPGA) or other programmable logic devices, discrete gates or transistor logic devices, and discrete hardware components, which can implement or perform the methods, steps, and logical block diagrams disclosed in the embodiments of the disclosure. The general-purpose processor may be a microprocessor, or the processor may also be any conventional processor or the like. The steps of the method disclosed in the embodiments of the disclosure may be directly embodied as being executed and completed by a hardware decoding processor, or executed and completed by a combination of hardware and software modules in the decoding processor. The software module can be located in a developed storage medium in the field, such as random access memory, flash memory, read-only memory, programmable read-only memory, or electrically erasable programmable memory, and registers. The storage medium is located in the memory, and the processor reads the information in the memory and completes the steps of the above method in combination with its hardware.

It can be understood that the memory in the embodiments of the disclosure may be a volatile memory or a non-volatile memory, or may include both volatile and non-volatile memory. Specifically, the non-volatile memory can be Read-Only Memory (ROM), Programmable ROM (PROM), Erasable PROM (EPROM), and Electrically EPROM (EEPROM) or flash memory. The volatile memory may be a Random Access Memory (RAM), which is used as an external cache. By way of exemplary but not restrictive description, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM) and Direct Rambus RAM (DR RAM). It should be noted that the memories of the systems and methods described herein are intended to include, but are not limited to, these and any other suitable types of memories.

Among them, the user equipment 1110 can be used to implement the corresponding functions implemented by the terminal device in the above method, and the network equipment 1120 can be used to implement the corresponding functions implemented by the network device in the above method. For brevity, it will not be repeated here.

It should be understood that the memory described above is exemplary but not restrictive. For example, the memory in the embodiment of the disclosure may also be static RAM (SRAM), dynamic RAM (DRAM), synchronous DRAM (SDRAM), double data rate SDRAM (DDR SDRAM), enhanced SDRAM (ESDRAM), synch link DRAM (SLDRAM) and Direct Rambus RAM (DR RAM), etc. That is to say, the memory in the embodiments of the disclosure is intended to include, but is not limited to, these and any other suitable types of memory.

The embodiments of the disclosure further provide a computer-readable storage medium for storing computer programs.

Optionally, the computer-readable storage medium may be applied to the network device in the embodiment of the disclosure, and the computer program enables the computer to execute the corresponding process implemented by the network device in various methods of the embodiment of the disclosure. For conciseness, related details are omitted.

Optionally, the computer-readable storage medium can be applied to the mobile terminal/terminal device in the embodiment of the disclosure, and the computer program enables the computer to execute the corresponding process implemented by the mobile terminal/terminal device in various methods of the embodiment of the disclosure. For conciseness, related details are omitted.

The embodiments of the disclosure further provide a computer program product, including computer program instructions.

Optionally, the computer program product may be applied to the network device in the embodiment of the disclosure, and the computer program instructions enable the computer to execute the corresponding process implemented by the network device in various methods of the embodiment of the disclosure. For conciseness, related details are omitted.

Optionally, the computer program product can be applied to the mobile terminal/terminal device in the embodiment of the disclosure, and the computer program instructions enable the computer to execute the corresponding process implemented by the mobile terminal/terminal device in various methods of the embodiment of the disclosure. For conciseness, related details are omitted.

The embodiment of the disclosure further provides a computer program.

Optionally, the computer program can be applied to the network device in the embodiment of the disclosure. When the computer program is run on the computer, the computer can execute the corresponding process implemented by the network device in various methods of the embodiment of the disclosure. For conciseness, related details are omitted.

Optionally, the computer program can be applied to the mobile terminal/terminal device in the embodiment of the disclosure. When the computer program is run on the computer, the computer can execute the corresponding process implemented by the mobile terminal/terminal device in various methods of the embodiment of the disclosure. For conciseness, related details are omitted.

A person of ordinary skill in the art may be aware that the units and algorithm steps of the examples described in combination with the embodiments disclosed herein can be implemented by electronic hardware or a combination of computer software and electronic hardware. Whether these functions are executed by hardware or software depends on the specific application and design requirement and conditions of the technical solution. Professionals and technicians can use different methods for each specific application to implement the described functions, but such implementation should not be construed as exceeding the scope of the disclosure.

Those skilled in the art can clearly understand that, for the convenience and conciseness of description, the specific operation process of the above-described system, device, and unit can be derived from the corresponding process in the foregoing method embodiment, and related details are omitted.

In the several embodiments provided in the disclosure, it should be understood that the disclosed system, device, and method may be implemented in other ways. For example, the device embodiments described above are only illustrative. For example, the division of the units is only a division of logical function, and there may be other divisions in actual implementation, for example, multiple units or components can be combined or integrated into another system, or some features can be ignored or not implemented. In addition, the exhibited or concerned mutual coupling or direct coupling or communication connection may be indirect coupling or communication connection through some interfaces, devices or units, and the coupling or connection may be realized in electrical, mechanical or other forms.

The units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the embodiments.

In addition, the functional units in the various embodiments of the disclosure may be integrated into one processing unit, or each unit may exist alone physically, or two or more units may be integrated into one unit.

If the function is implemented in the form of a software functional unit and sold or used as an independent product, it can be stored in a computer readable storage medium. Based on this understanding, the technical solution of the disclosure essentially or the part that contributes to the existing technology or the part of the technical solution can be embodied in the form of a software product. Moreover, the computer software product is stored in a storage medium, including that several instructions are used to enable a computer device (which may be a personal computer, a server, or a network device, etc.) to execute all or part of the steps of the methods described in the various embodiments of the disclosure. The storage media include: USB flash drive, mobile hard disk, Read-Only Memory (ROM), Random Access Memory (RAM), magnetic disk or optical disk and other media that can store program code.

The above are only specific implementations of the disclosure, but the scope sought to be protected by the disclosure is not limited thereto. Any person skilled in the art can easily think of changes or substitutions within the technical scope disclosed in the disclosure. The above changes or substitutions should fall within the scope of the disclosure. Therefore, the scope sought to be protected by the disclosure shall be subject to the claims.

What is claimed is:

1. A random access method, the method comprising:
   detecting a scheduling instruction of a second message in a first window after a user equipment (UE) sends a first message, wherein the first message comprises a preamble and an uplink data channel;
   the second message comprising at least one of the following: a first conflict resolution identifier, a second conflict resolution identifier, first indication information, and second indication information, wherein the first conflict resolution identifier is used for conflict resolution of a connected UE; the second conflict resolution identifier is used for conflict resolution of an idle UE, an inactive UE, or the connected UE; the first indication information is used for indicating that a two-step random access process returns to a four-step random access process;
   the second message comprises a media access control (MAC) protocol data unit (PDU), and the MAC PDU comprises at least one of the following:
   the second conflict resolution identifier; and
   a random access response (RAR), and the RAR is used to indicate that the two-step random access process returns to the four-step random access process, wherein the MAC PDU comprises a plurality of MAC sub-PDUs, which comprise a first sub-header and a target MAC sub-PDU, the first sub-header carries third indication information, and the third indication information is used to indicate a type of the target MAC sub-PDU, and the type of the target MAC sub-PDU refers to a second MAC sub-PDU or a third MAC sub-PDU, the first sub-header further carries second type information, and the second type information is used to indicate whether the first sub-header contains random access preamble ID (RAPID) or backoff indication (BI) information with backoff indication.

2. The method according to claim 1, wherein the MAC PDU comprises at least one of the following:
a first media access control sub-PDU, wherein the first MAC sub-PDU carries the first conflict resolution identifier, and the first conflict resolution identifier is a cell radio network temporary identifier (C-RNTI);
the second MAC sub-PDU, wherein the second MAC sub-PDU carries the second conflict resolution identifier;
the third MAC sub-PDU, wherein the third MAC sub-PDU carries the random access response (RAR).

3. The method according to claim 2, wherein the RAR comprises uplink timing advance information, uplink scheduling information, and a temporary cell radio network temporary identifier (TC-RNTI).

4. The method according to claim 2, wherein the type of the target MAC sub-PDU refers to the first MAC sub-PDU, the second MAC sub-PDU, or the third MAC sub-PDU.

5. The method according to claim 4, wherein the first sub-header further carries the random access preamble ID (RAPID).

6. A random access method, the method comprising:
a network device receives a first message transmitted by a user equipment (UE), and transmits a scheduling instruction of a second message in a first window, wherein the first message comprises a preamble and an uplink data channel;
wherein the second message comprises at least one of the following: a first conflict resolution identifier, a second conflict resolution identifier, first indication information, and second indication information, wherein the first conflict resolution identifier is used for conflict resolution of a connected UE, the second conflict resolution identifier is used for conflict resolution of an idle UE, an inactive UE, or the connected UE; the first indication information is used for indicating that a two-step random access process returns to a four-step random access process;
the second message comprises a media access control (MAC) protocol data unit (PDU), and the MAC PDU comprises at least one of the following:
the second conflict resolution identifier; and
a random access response (RAR), and the RAR is used to indicate that the two-step random access process returns to the four-step random access process, wherein the MAC PDU comprises a plurality of MAC sub-PDUs, which comprise a first sub-header and a target MAC sub-PDU, the first sub-header carries third indication information, and the third indication information is used to indicate a type of the target MAC sub-PDU, and the type of the target MAC sub-PDU refers to a second MAC sub-PDU or a third MAC sub-PDU, the first sub-header further carries second type information, and the second type information is used to indicate whether the first sub-header contains random access preamble ID (RAPID) or backoff indication (BI) information with backoff indication.

7. The method according to claim 6, wherein the MAC PDU comprises at least one of the following:
a first MAC sub-PDU, wherein the first MAC sub-PDU carries the first conflict resolution identifier, and the first conflict resolution identifier is a cell radio network temporary identifier (C-RNTI);
the second MAC sub-PDU, wherein the second MAC sub-PDU carries the second conflict resolution identifier;
the third MAC sub-PDU, wherein the third MAC sub-PDU carries the random access response (RAR).

8. A random access device, which is applied to a user equipment (UE), and the device comprising:
a transmitter, configured to transmit a first message, wherein the first message comprises a preamble and an uplink data channel;
a receiver, configured to detect a scheduling instruction of a second message in a first window;
wherein the second message comprises at least one of the following: a first conflict resolution identifier, a second conflict resolution identifier, first indication information, and second indication information, wherein the first conflict resolution identifier is used for conflict resolution of a connected UE; the second conflict resolution identifier is used for conflict resolution of an idle UE, an inactive UE, or the connected UE; the first indication information is used for indicating that a two-step random access process returns to a four-step random access process;
the second message comprises a media access control (MAC) protocol data unit (PDU), and the MAC PDU comprises at least one of the following:
the second conflict resolution identifier; and
a random access response (RAR), and the RAR is used to indicate that the two-step random access process returns to the four-step random access process, wherein the MAC PDU comprises a plurality of MAC sub-PDUs, which comprise a first sub-header and a target MAC sub-PDU, the first sub-header carries third indication information, and the third indication information is used to indicate a type of the target MAC sub-PDU, and the type of the target MAC sub-PDU refers to a second MAC sub-PDU or a third MAC sub-PDU, the first sub-header further carries second type information, and the second type information is used to indicate whether the first sub-header contains random access preamble ID (RAPID) or backoff indication (BI) information with backoff indication.

9. The random access device according to claim 8, wherein the MAC PDU comprises at least one of the following:
a first MAC sub-PDU, wherein the first MAC sub-PDU carries the first conflict resolution identifier, and the first conflict resolution identifier is a cell radio network temporary identifier (C-RNTI);
the second MAC sub-PDU, wherein the second MAC sub-PDU carries the second conflict resolution identifier;
the third MAC sub-PDU, wherein the third MAC sub-PDU carries the random access response (RAR).

10. The random access device according to claim 9, wherein the RAR comprises uplink timing advance information, uplink scheduling information, and a temporary cell radio network temporary identifier (TC-RNTI).

11. The random access device according to claim 9, wherein the type of the target MAC sub-PDU refers to the first MAC sub-PDU, the second MAC sub-PDU, or the third MAC sub-PDU.

12. The random access device according to claim 11, wherein the first sub-header further carries the random access preamble ID (RAPID).

13. A random access device, which is applied to a network device, the device comprising:
a receiver, configured to receive a first message sent by a user equipment (UE), wherein the first message comprises a preamble and an uplink data channel;

a transmitter, configured to transmit a scheduling instruction of a second message in a first window;

wherein the second message comprises at least one of the following: a first conflict resolution identifier, a second conflict resolution identifier, first indication information, and second indication information, wherein the first conflict resolution identifier is used for conflict resolution of a connected UE; the second conflict resolution identifier is used for conflict resolution of an idle UE, an inactive UE, or the connected UE; the first indication information is used for indicating that a two-step random access process returns to a four-step random access process;

the second message comprises a media access control (MAC) protocol data unit (PDU), and the MAC PDU comprises at least one of the following:

the second conflict resolution identifier; and a random access response (RAR), and the RAR is used to indicate that the two-step random access process returns to the four-step random access process, wherein the MAC PDU comprises a plurality of MAC sub-PDUs, which comprise a first sub-header and a target MAC sub-PDU, the first sub-header carries third indication information, and the third indication information is used to indicate a type of the target MAC sub-PDU, and the type of the target MAC sub-PDU refers to a second MAC sub-PDU or a third MAC sub-PDU, the first sub-header further carries second type information, and the second type information is used to indicate whether the first sub-header contains random access preamble ID (RAPID) or backoff indication (BI) information with backoff indication.

14. The random access device according to claim 13, wherein the MAC PDU comprises at least one of the following:

a first MAC sub-PDU, wherein the first MAC sub-PDU carries the first conflict resolution identifier, and the first conflict resolution identifier is a cell radio network temporary identifier (C-RNTI);

the second MAC sub-PDU, wherein the second MAC sub-PDU carries the second conflict resolution identifier;

the third MAC sub-PDU, wherein the third MAC sub-PDU carries the random access response (RAR).

* * * * *